United States Patent
Burgand

[11] Patent Number: 5,538,553
[45] Date of Patent: Jul. 23, 1996

[54] ORGANOMINERAL PASTE AND METHOD OF USE AS CONSTRUCTION MATERIAL

[76] Inventor: Yves Burgand, 116 Lakeside Dr., Rte. 3, Fort Valley, Ga. 31030

[21] Appl. No.: 574,035

[22] Filed: Dec. 18, 1995

[51] Int. Cl.$^6$ .......................... C04B 18/24; C04B 18/10; C04B 16/02
[52] U.S. Cl. .......................... 106/795; 106/697; 106/708; 106/731; 106/780
[58] Field of Search .................................. 106/697, 708, 106/731, 780, 795

[56] References Cited

U.S. PATENT DOCUMENTS

| | | | |
|---|---|---|---|
| 4,406,703 | 9/1983 | Guthrie et al. | 106/731 |
| 4,840,672 | 6/1989 | Baes | 106/731 |
| 5,340,513 | 8/1994 | Koslowski et al. | 106/731 |
| 5,346,549 | 9/1994 | Johnson | 106/708 |
| 5,350,451 | 9/1994 | Patterson | 106/731 |
| 5,500,044 | 3/1996 | Meade et al. | 106/708 |

Primary Examiner—David Brunsman

[57] ABSTRACT

An organomineral construction paste comprises a mixture of a suspension of cellulose, lime and an aqueous solution of a sulfate and hydrogen peroxide. Airborne ash and hydraulic binders may also be added to impart additional moldable properties to the paste.

11 Claims, No Drawings

ORGANOMINERAL PASTE AND METHOD OF USE AS CONSTRUCTION MATERIAL

TECHNICAL FIELD

The invention relates to organomineral pastes as well as to methods of use of pastes as construction materials.

BACKGROUND OF THE INVENTION

There are numerous known construction materials based on hydraulic binders and more particularly cement, such as building blocks, concrete products, outside coatings, fire protection materials, and ground surface coverings. However, all of these materials experience extensive shrinkage, which leads to the presence of cracks. This shrinkage is due to the evaporation of the water in the finished products.

Clay bricks, which are obtained by molding, are also known construction materials. Brick manufacture, however, entails a cooking step.

There is also a known process for recycling airborne ash which is also known as fluidized bed ashes from blast furnaces and heating stations, wherein the airborne ash is mixed with other construction materials in order to make road coverings, for example. However, compositions presently containing airborne ash cannot be used as construction material because they do not have the necessary mechanical properties such as strength.

Accordingly, a need remains for a construction material which utilizes recycled materials, does not show immediate signs of evaporation, and which does not require cooking steps in manufacturing to produce.

DETAILED DESCRIPTION OF THE INVENTION

The invention is based on the use of waste, in particular waste coming from the manufacture of paper, for the manufacture of construction materials as diverse as bricks, building blocks, concrete products, outside coatings, fire protection materials, and ground surface coverings.

The invention aims to overcome the previously described disadvantages by providing an organomineral paste that is characterized by the fact that it is obtained by mixing a suspension of cellulose fibers and/or cellulose waste and/or primary sludge from papermaking and/or wastepaper with a suspension of lime, to which mixture an aqueous solution of sulfate and hydrogen peroxide is added.

More precisely, the mixture includes 1 part by weight of the cellulose fibers and/or cellulose waste and/or primary sludge from papermaking and/or wastepaper and between approximately 0.7 and 0.8 parts by weight of lime, and between approximately 10 and 12 parts by weight of water. The aqueous solution is obtained by mixing approximately 1 part by weight of iron sulfate with between approximately 2.5 and 3 parts by weight of water and between approximately 0.6 and 0.7 parts by weight 130-volume [≈33 wt %] hydrogen peroxide. Herein lime is intended to include both calcium oxide (CaO), as well as Calcium Hydroxide (Ca(OH)$_2$).

According to one characteristic of the paste of the invention, the mixture is obtained by mixing 1 part by weight of primary sludge from papermaking with 0.75 parts by weight of lime and 11 parts by weight of water. The aqueous solution is obtained by the mixing of 1 part by weight of iron sulfate with 2.7 parts by weight of water and 0.65 parts by weight of 130-volume hydrogen peroxide.

According to another characteristic of the paste of the invention, the weight ratio of the mixture to the solution is between 7:1 and 8:1. More precisely, the weight ratio of the mixture to the solution is 7.65:1.

The paste of the invention can also contain airborne ash and a hydraulic binder. In this case it is comprised of a mixture of approximately 1 part by weight of actual paste with between approximately 0.9 and 1.3 parts airborne ash and between approximately 0.01 and 0.02 parts by weight hydraulic binder.

A preferred paste contains 1 part by weight of actual paste, 1.1 parts by weight of airborne ash, and 0.01 parts by weight hydraulic binder. The preferred hydraulic binder of the invention is cement.

The use of the paste in the manufacturing of a construction material is also an object of the invention.

In effect, it has been found that a suspension of cellulose fibers, cellulose waste and waste from the primary sludge of the papermaking process or wastepaper disposal process, in water, to which a suspension of lime and a solution of iron sulfate and hydrogen peroxide are added, allows one to obtain a homogeneous organomineral paste that can be used in the manufacture of a construction material with thermal insulation, sound insulation, and fire resistance properties.

The organomineral paste of the invention is obtained by a process which includes two steps:

1. pulping of the waste by mixing of approximately 1 part by weight cellulose fibers and/or cellulose waste and/or primary sludge from papermaking and/or wastepaper with between approximately 0.7 and 0.8 parts by weight of lime and between approximately 10 and 11 parts by weight of water, and 2. mixing of the pulped waste obtained in the preceding step with a solution obtained by mixing of approximately 1 part by weight of iron sulfate with between approximately 2.5 and 3 parts by weight of water and between approximately 0.6 and 0.7 parts by weight of 130-volume hydrogen peroxide.

Preferably, in the first step 1 part by weight of the suspension of cellulose fibers and/or cellulose waste and/or primary sludge from papermaking and/or wastepaper is mixed with 0.75 parts by weight of lime and 11 parts by weight of water. The solution used in the second step is obtained by mixing approximately 1 part by weight of iron sulfate with approximately 2.7 parts by weight of water and approximately 0.65 parts by weight of 130-volume hydrogen peroxide.

In the second step approximately 7 and 8 parts by weight of the mixture obtained in the first step is mixed with approximately 1 part by weight of the solution of iron sulfate described in the second step. Preferably, 7.66 parts by weight of the mixture obtained in the first step is mixed with 1 part by weight of the solution of iron sulfate described in the second step.

In a preferred embodiment of the invention, primary sludge is used from the papermaking process rather than cellulose fibers and/or cellulose waste because, in this case, the use of large pulpers for pulping this waste can be avoided, and it is sufficient to use a conventional mixer. However, the paste obtained cannot be used as construction material because it is difficult to mold, for example, in the form of bricks or building blocks, and because it contains a large quantity of water and must therefore be dried with heat. Furthermore, when dried, the paste of the invention requires excessive shrinkage for it to be usable.

In order to avoid the problem of shrinkage, and still obtain a construction material that can be sprayed or floated, with good mechanical properties, the organomineral paste according to the invention is used in a mixture with a hydraulic binder such as cement.

In order to obtain a product which can be molded in the form of bricks, building blocks, or curbstones or any moldable concrete product, waste which one generally wishes to recycle, such as airborne ash, is added to the paste according to the invention with the hydraulic binder. Such ash may come from blast furnaces and/or from heating stations. The airborne ash acts as a liquefier and plasticizer and gives the composition of the invention, properties of molding ability which are due to the airborne ash. Due to the low density of the paste of the invention, resulting from its inclusion of modified cellulose fibers, the product obtained has excellent sound and heat insulation and fire resistance properties.

Surprisingly, it has been discovered that a very small quantity of hydraulic binder, on the order of approximately 5% by weight of the total Composition, is sufficient to give the final construction material obtained from the paste of the invention sufficient mechanical properties so that it can be used as it is. Obviously, greater quantities of hydraulic binder may be used as desired. Furthermore, with 5% by weight hydraulic binder, the shrinkage after 7 days of drying is less than 200 μm per meter. This result compares with a shrinkage of greater than 1,000 μm per meter in the case of mortars, and up to 4,000 μm per meter in the case of a microconcrete after 7 days of drying.

Tests of mechanical strength performed on construction materials obtained by simple drying of the paste of the invention in open air show that there is a noncleavage fracture which allows the construction material to be used in seismic risk zones.

The construction material obtained from the composition according to the invention retains all of its properties when the composition is obtained by mixing of approximately 1 part by weight of the cellulose paste with between approximately 0.9 and 1.3 parts by weight of airborne ash and between approximately 0.02 and 0.01 parts by weight of cement. A preferred composition is, however, obtained by mixing 1 part by weight of the cellulose paste with 1.1 parts by weight of airborne ash and 0.01 parts by weight of cement.

The airborne ash can be replaced by pozzolana or any other equivalent material. However, a preferred composition includes airborne ash from coal heating stations known as "fluidized bed ashes."

Additionally, other sulfates may be used instead of iron sulfate, including aluminum sulfate, potassium sulfate, sodium sulfate, calcium sulfate, and ammonium sulfate.

Various additives known in the field of construction materials can be added to the composition of the invention such as coloring agents. White cement can be used as a hydraulic binder in order to give the desired color to the final material.

The invention will now be described by means of a preferred example of the composition according to the invention, which is given only for the sake of illustration and not for limiting the invention.

Example.

300 kg primary sludge from papermaking is mixed with 225 kg lime and 3,300 kg water. The mixture is stirred to keep the cellulose fibers from settling; mixed with a solution composed of 115 kg ferrous iron sulfate, 310 kg water, and 75 kg 130-volume hydrogen peroxide. The hydrogen peroxide transforms the ferrous iron sulfate into ferric iron sulfate.

The resultant organomineral paste is homogenous and contains a high water weight. The presence of this high water weight provides the advantage of not requiring the addition of more water during the manufacture of the actual construction material, i.e. the addition of the hydraulic binder and of the airborne ash.

In order to obtain a construction material according to the invention, one mixes the cellulose paste obtained above with 2,162 kg fluidized bed ash and 217 kg cement. A composition is obtained which can be molded in any form, such as bricks, curbstones, etc., with a very low degree of shrinkage with drying. Drying can advantageously be natural, done in the air at ambient temperature and pressure. The resultant material exhibits good thermal conductivity, good compressive, tensile strength, and has a low density. This composition can also be used as a coating, which can be sprayed or floated. It can contain a water-retaining substance such as methylcellulose, hydroxyethylcellulose, and carboxymethylcellulose, a waterproofing agent such as silicone, a calcium or magnesium stearate, or any other additive for the purpose of giving other particular properties to the composition of the invention, as are known in the field, such as gypsum, calcium sulfate, a natural or synthetic resin, a plasticizer, or an air entraining agent.

I claim:

1. An organomineral paste comprising a mixture of a first suspension of materials selected from the group consisting of cellulose fibers, cellulose waste, primary sludge from papermaking, and wastepaper; a second suspension of lime; an aqueous solution of a sulfate selected from the group consisting of iron sulfate, aluminum sulfate, calcium sulfate, sodium sulfate, potassium sulfate, and ammonium sulfate; and hydrogen peroxide.

2. A paste as claimed in claim 1, wherein said sulfate is iron sulfate.

3. A paste as claimed in claim 2, wherein said hydrogen peroxide is 130-volume hydrogen peroxide.

4. A paste as claimed in claim 3, wherein said first suspension is present in about 1 part by weight; said suspension of lime includes between about 0.7 and 0.8 parts by weight of lime and between about 10 and 12 parts by weight of water; said aqueous solution of iron sulfate includes about 1 part by weight of iron sulfate and between about 2.5 and 3 parts by weight of water; and said 130-volume hydrogen peroxide is present between about 0.6 and 0.7 parts by weight.

5. A paste as claimed in claim 4, wherein said first suspension includes about 1 part by weight primary sludge from papermaking; said suspension of lime includes about 0.75 parts by weight of lime and about 11 parts by weight of water; said aqueous solution of iron sulfate includes about 1 part by weight of iron sulfate and about 2.7 parts by weight of water; and said hydrogen peroxide is present in about 0.65 parts by weight.

6. A paste as claimed in claim 1 wherein the weight ratio of said first suspension to said aqueous solution is in the range of about 7:1 and 8:1.

7. A paste as claimed in claim 6 wherein the weight ratio of said first suspension to said aqueous solution is about 7.65:1.

8. A paste as claimed in claim 1 further comprising airborne ash and a hydraulic binder.

9. A paste as claimed in claim 8 wherein said first suspension is present in about 1 part by weight; said airborne ash is present between about 1 and 1.3 parts by weight; and said hydraulic binder is present between about 0.01 and 0.02 parts by weight.

10. A paste as claimed in claim 9 wherein airborne ash is present in about 1.1 parts by weight, and hydraulic binder is present in about 0.01 parts by weight.

11. A paste as claimed in claim 8 wherein said hydraulic binder is cement.

* * * * *